(12) United States Patent
Heilmann

(10) Patent No.: US 11,760,286 B2
(45) Date of Patent: Sep. 19, 2023

(54) BUMPER CROSSMEMBER, AND VEHICLE REAR ARRANGEMENT WITH BUMPER CROSSMEMBER

(71) Applicant: Dr. Ing. h.c. F. Porsche Aktiengesellschaft, Stuttgart (DE)

(72) Inventor: Tassilo Heilmann, Pforzheim (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 227 days.

(21) Appl. No.: 17/340,204

(22) Filed: Jun. 7, 2021

(65) Prior Publication Data
US 2021/0380057 A1 Dec. 9, 2021

(30) Foreign Application Priority Data
Jun. 8, 2020 (DE) .................... 10 2020 115 184.5

(51) Int. Cl.
| B60R 19/18 | (2006.01) |
| B60R 19/48 | (2006.01) |
| B60R 19/04 | (2006.01) |
| B60H 1/00  | (2006.01) |

(52) U.S. Cl.
CPC ......... *B60R 19/18* (2013.01); *B60H 1/00564* (2013.01); *B60R 19/04* (2013.01); *B60R 19/48* (2013.01); *B60R 2019/182* (2013.01); *B60R 2019/1866* (2013.01)

(58) Field of Classification Search
CPC ... B60R 19/04; B60R 19/18; B60R 2019/486; B60R 19/48; B60R 2019/182; B60R 2019/1813; B60R 2019/1866; B60R 2019/1806

USPC .......................................... 293/117; 180/68.1
See application file for complete search history.

(56) References Cited

U.S. PATENT DOCUMENTS

| 2,612,344 A | * | 9/1952 | Thompson ................ B66F 7/16 |
| | | | 187/218 |
| 2,850,314 A | * | 9/1958 | Haigh ................... F01N 13/082 |
| | | | 239/289 |
| 3,869,167 A | * | 3/1975 | Muller ..................... B60R 19/18 |
| | | | 267/140 |
| 4,566,407 A | | 1/1986 | Peter |
| 4,597,601 A | * | 7/1986 | Manning ................. B60R 19/18 |
| | | | 293/133 |
| 5,726,398 A | * | 3/1998 | Zahn ......................... F01N 1/10 |
| | | | 181/282 |

(Continued)

FOREIGN PATENT DOCUMENTS

| DE | 3338466 A1 | 5/1985 |
| DE | 4232870 A1 | 3/1994 |

(Continued)

*Primary Examiner* — Dennis H Redder
*Assistant Examiner* — Kevin P Weldon
(74) *Attorney, Agent, or Firm* — RatnerPrestia

(57) ABSTRACT

A bumper crossmember for a vehicle, with a hollow profile body which has a vehicle frame-side proximal vertical wall and a distal vertical wall which are connected to one another by way of transverse walls and extend along a vertical direction. The transverse walls laterally delimit hollow chambers which are arranged in the hollow profile body. The center longitudinal direction of the hollow chambers are oriented in each case along the vertical direction, and the hollow chambers are open on the end side.

9 Claims, 4 Drawing Sheets

(56) References Cited

U.S. PATENT DOCUMENTS

| | | | | |
|---|---|---|---|---|
| 5,860,685 | A * | 1/1999 | Horney | B60R 19/48 |
| | | | | 180/68.1 |
| 6,000,738 | A * | 12/1999 | Stewart | B60R 19/18 |
| | | | | 293/120 |
| 6,712,410 | B2 * | 3/2004 | Kudelko | B60R 19/18 |
| | | | | 293/120 |
| 2006/0255604 | A1 * | 11/2006 | Condeelis | B60R 19/18 |
| | | | | 293/121 |
| 2011/0187134 | A1 * | 8/2011 | Steller | B60R 19/48 |
| | | | | 293/115 |
| 2017/0136970 | A1 * | 5/2017 | Steinebach | B60R 19/03 |
| 2019/0176694 | A1 * | 6/2019 | Schmitt | B60R 19/48 |
| 2020/0062107 | A1 * | 2/2020 | Nakamura | B60K 11/06 |

FOREIGN PATENT DOCUMENTS

| | | | | |
|---|---|---|---|---|
| DE | 10143890 A1 | 3/2003 | | |
| DE | 102009049213 A1 | 4/2011 | | |
| DE | 102016113883 A1 | 2/2018 | | |
| EP | 1473197 A1 * | 11/2004 | | B60R 19/18 |
| FR | 3054186 A1 * | 1/2018 | | B60R 19/12 |
| KR | 20040035053 A * | 4/2004 | | |

* cited by examiner

BUMPER CROSSMEMBER, AND VEHICLE REAR ARRANGEMENT WITH BUMPER CROSSMEMBER

CROSS-REFERENCE TO RELATED APPLICATION

This application claims priority to German Patent Application No. 10 2020 115 184.5, filed Jun. 8, 2020, which is incorporated by reference herein in its entirety.

FIELD OF THE INVENTION

The invention relates to a bumper crossmember for a vehicle. In addition, the invention relates to a vehicle rear arrangement with a bumper crossmember of this type.

BACKGROUND OF THE INVENTION

DE 10 2016 113 883 A1, which is incorporated by reference herein, discloses a motor vehicle bumper crossmember, the lower transverse wall of which is inclined and is therefore adapted to an air duct which is routed past it. This leads to a high installation space requirement of the components. In addition, a constriction can be produced in the air duct in the region of the motor vehicle bumper crossmember.

SUMMARY OF THE INVENTION

The bumper crossmember serves for a vehicle, in particular for a motor vehicle. The bumper crossmember has a hollow profile body which has a vehicle frame-side proximal vertical wall and a distal vertical wall which are connected to one another by way of transverse walls and extend along a vertical direction. The transverse walls laterally (that is to say, toward the sides) delimit hollow chambers which are arranged in the hollow profile body, the center longitudinal direction of the hollow chambers being oriented in each case along the vertical direction, and the hollow chambers being open on the end side (that is to say, toward the top and bottom).

In this way, the hollow profile body can be utilized for conducting an air flow through its chambers, for example outgoing air of an air-cooled cooling unit, and for structural load transfer. Packaging advantages can be achieved as a result, since the hollow profile body can be incorporated into an air duct and does not have to be bypassed by the latter.

The bumper crossmember forms a constituent part of a crash management system of a vehicle. In the case of an impact, the bumper crossmember serves to introduce forces into the vehicle frame. The bumper crossmember can be coupled, for example, by means of crash boxes to the vehicle frame, for example to longitudinal carriers of the vehicle frame.

The bumper crossmember extends along a longitudinal direction (profile length) which, in the assembled state, is oriented substantially parallel to the transverse axis of the vehicle (y-axis). The bumper crossmember extends along the abovementioned vertical direction (profile height) which, in the assembled state, is oriented substantially parallel to the vertical axis of the vehicle (z-axis). In addition, the bumper crossmember extends along a thickness direction (profile thickness) which, in the assembled state, is oriented substantially parallel to the longitudinal axis of the vehicle (x-axis).

The hollow profile body can preferably have a greater cross section (greater profile thickness) in a middle region along its longitudinal direction than at its ends. The vertical walls are spaced apart further from one another in the middle region (greater profile thickness). This is advantageous in terms of structural mechanics, and improves the throughflow by way of a large-area cross section. By way of the increased cross section, similar or decreased deflection and stress values can be achieved as in the case of conventional profiles. On the end side, that is to say toward the longitudinal carriers, the cross section can decrease to the profile thickness of conventional profiles.

The hollow profile body can preferably be cambered at least in sections along its longitudinal direction, for example in a middle region along its longitudinal direction. By means of the cambering, the "sweep" of a vehicle rear can be followed.

The hollow profile body can preferably be configured as an extrusion profile, for example as an extruded aluminum profile. In this way, inexpensive manufacturing even of complex profile shapes is possible. The extrusion direction is oriented along the vertical direction, that is to say along the profile height. If cambering is desired, this can already be brought about during the production of the extrusion profile (vertical extrusion) by means of the extrusion die. A separate bending operation can be dispensed with. This benefits manufacturing.

A single-piece configuration of the hollow profile body is fundamentally conceivable. This reduces the number of components of a crash management system.

As an alternative to this, the hollow profile body can be formed from two profile halves which are preferably symmetrical and are connected to one another on a parting plane. In this way, the production benefits from a smaller profile size, since a smaller tool, for example a smaller extrusion die, can be used. The hollow profile body is divided along its longitudinal direction into two profile halves (two axial profile halves). The parting plane lies in the middle region of the hollow profile body, in particular centrally with respect to its ends. The longitudinal direction of the hollow profile body represents the normal vector of the parting plane. The parting plane does not have to be a plane in the mathematical sense, but rather can also have a structuring (parting point).

The profile halves can preferably be screwed, welded, riveted and/or adhesively bonded to one another on the parting plane. In this way, a structurally simple and stable fastening is produced.

As an alternative or in addition, on the parting plane, the profile halves can have a pronged structure, via which the profile halves can be connected or are connected to one another in a positively locking manner. In this way, a connection which is simple to produce and is stable is produced. The pronged structure can have dovetail-shaped elevations and depressions in an alternating manner. They can engage into one another in an alternating manner in the case of assembled profile halves. If the profile halves are assembled, a depth offset can occur, that is to say the profile halves can be arranged offset slightly with respect to one another along the vertical direction (profile height).

The profile halves can preferably be secured on one another against a relative movement along the vertical direction (profile height). As a result, in the case of a load which acts on the hollow profile body, for example an impact, it can be prevented that the profile halves move along the vertical direction. The profile halves can be secured on one another by way of a vertical weld or a screw connection.

The vehicle rear arrangement serves for a vehicle, in particular for a rear engine vehicle. The vehicle rear arrangement has a bumper crossmember as described above, and an air duct which is formed by a duct body. The air duct extends from an inlet opening (vehicle upper side) through an air-cooled cooling unit (for example, an intercooler) which is incorporated into the air duct to an outlet opening (opening on the vehicle rear trim body). The bumper crossmember is arranged at least partially in the duct body, with the result that the air duct is routed through a plurality of chambers of the hollow profile body of the bumper crossmember. In this way, air which is conducted in the air duct (for example, outgoing air of the cooling unit) can flow through chambers of the hollow profile body.

In this way, a crash management system, through which flow passes, or a bumper crossmember, through which flow passes, for a rear of a rear engine vehicle is provided. The bumper crossmember or its chambers can be flowed through by the outgoing air of the air-cooled cooling unit (for example, an intercooler). The center longitudinal direction of the chambers of the bumper crossmember correspond substantially to the throughflow direction of the air duct.

Constrictions in the air duct can be largely avoided by the bumper crossmember being integrated (for example, along its longitudinal direction) at least partially into the air duct, since the hollow profile body can be incorporated into an air duct and does not have to be bypassed by the latter. The duct body can be configured from plastic or sheet metal.

Instead of one air duct which is routed through a duct body, two air ducts which are parallel to one another and are arranged symmetrically, for example, with respect to the center longitudinal axis of the vehicle can be provided as an alternative, which air ducts are routed through a duct body and open into an outlet opening.

The vehicle rear arrangement can have a vehicle rear trim body, in which one or more outlet openings for the air duct or ducts is/are configured.

BRIEF DESCRIPTION OF THE DRAWINGS

Further advantageous refinements result from the following description and the drawing, in which.

DETAILED DESCRIPTION OF THE INVENTION

Figure 1:
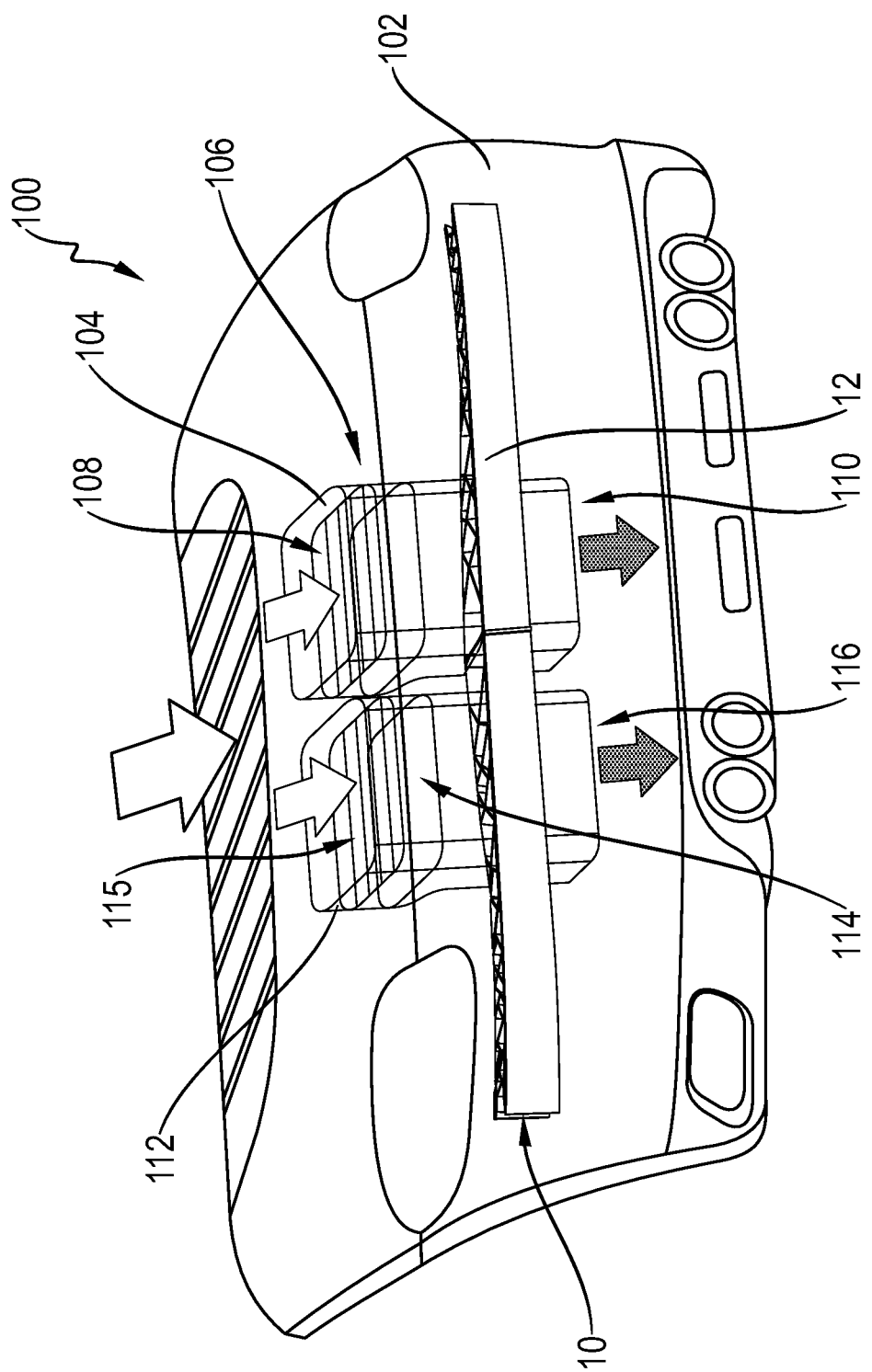
FIG. 1 diagrammatically shows a vehicle rear arrangement with a bumper crossmember and an air duct, FIG. 2 diagrammatically shows a longitudinal section through the vehicle rear arrangement from FIG. 1, FIG. 3 diagrammatically shows a perspective view of the hollow profile body of the bumper crossmember, and FIG. 4 diagrammatically shows the pronged structure on the parting plane of the profile halves of the hollow profile body.

FIG. 1 diagrammatically shows a vehicle rear arrangement 100, with a vehicle rear trim body 102, a bumper crossmember 10 with a hollow profile body 12 and an air duct 106 which is formed by a duct body 104 and extends from an inlet opening 108 on the vehicle upper side to an outlet opening 110 on the vehicle rear trim body 102.

The vehicle rear arrangement 100 has a second air duct 114 which is routed through a duct body 112, with the result that two air ducts 106, 114 which are parallel to one another and are arranged symmetrically with respect to the center longitudinal axis of the vehicle are provided, which air ducts 106, 114 are routed in each case through a duct body 104, 112 and open from an inlet opening 108, 115 into an outlet opening 110, 116.

Figure 2:
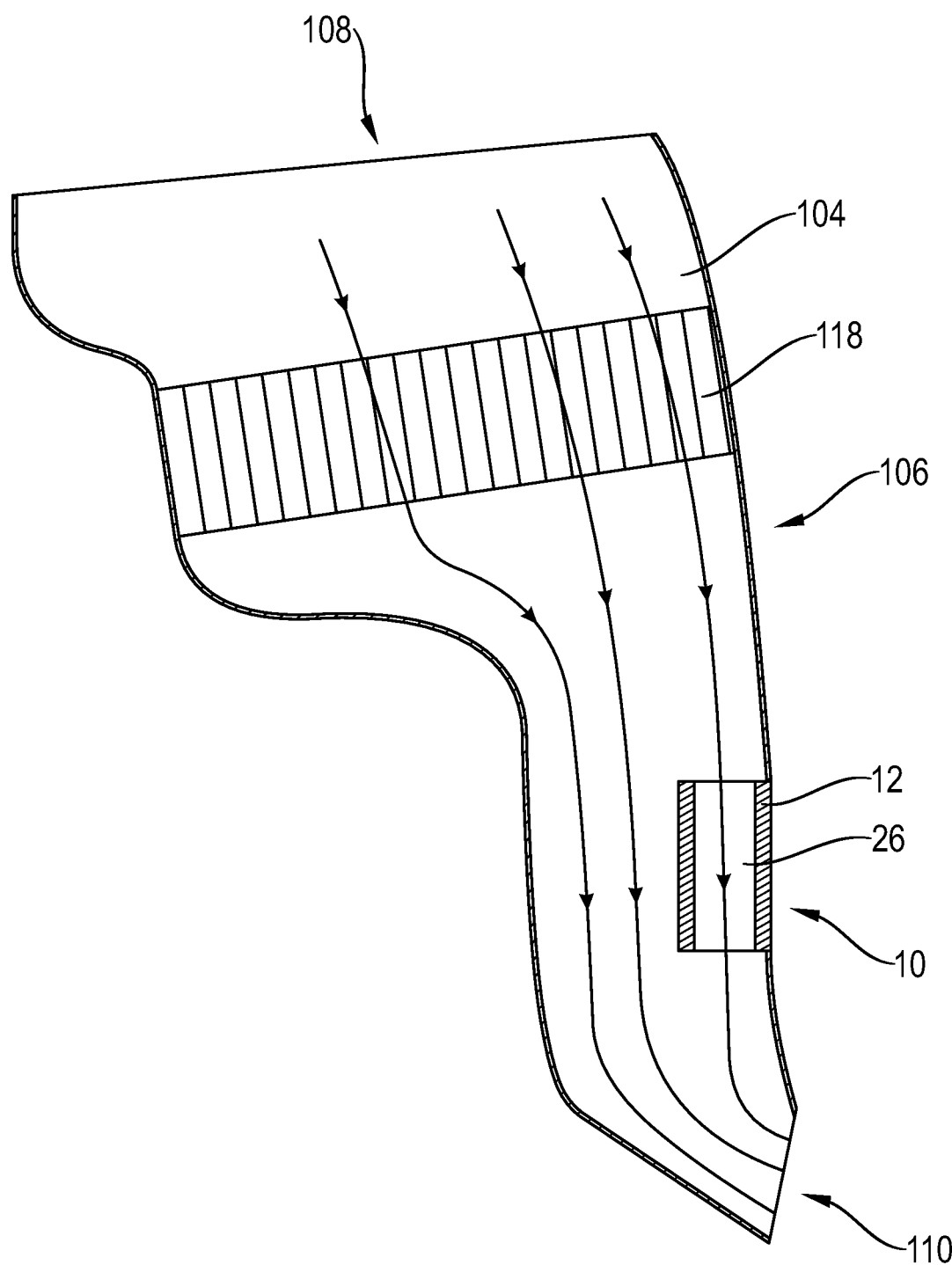

FIG. 2 shows a longitudinal section through the vehicle rear arrangement 100 in the region of the air duct 106. The air duct 106 which is formed by way of the duct body 104 extends from the inlet opening 108 through an air-cooled cooling unit 118 which is incorporated into the air duct 106 and is configured in the example as an intercooler, to the outlet opening 110. The bumper crossmember 10 is arranged at least partially in the duct body 104, with the result that the air duct 106 is routed through a plurality of chambers 26 of the hollow profile body 12 of the bumper crossmember 10. In this way, air which is conducted in the air duct 106 (for example, outgoing air of the cooling unit 118) can flow through chambers 26 of the hollow profile body 12 (air flow illustrated by way of a plurality of arrows). The center longitudinal direction of the chambers 26 of the bumper crossmember 10 correspond substantially to the throughflow direction of the air duct 106.

Figure 3:
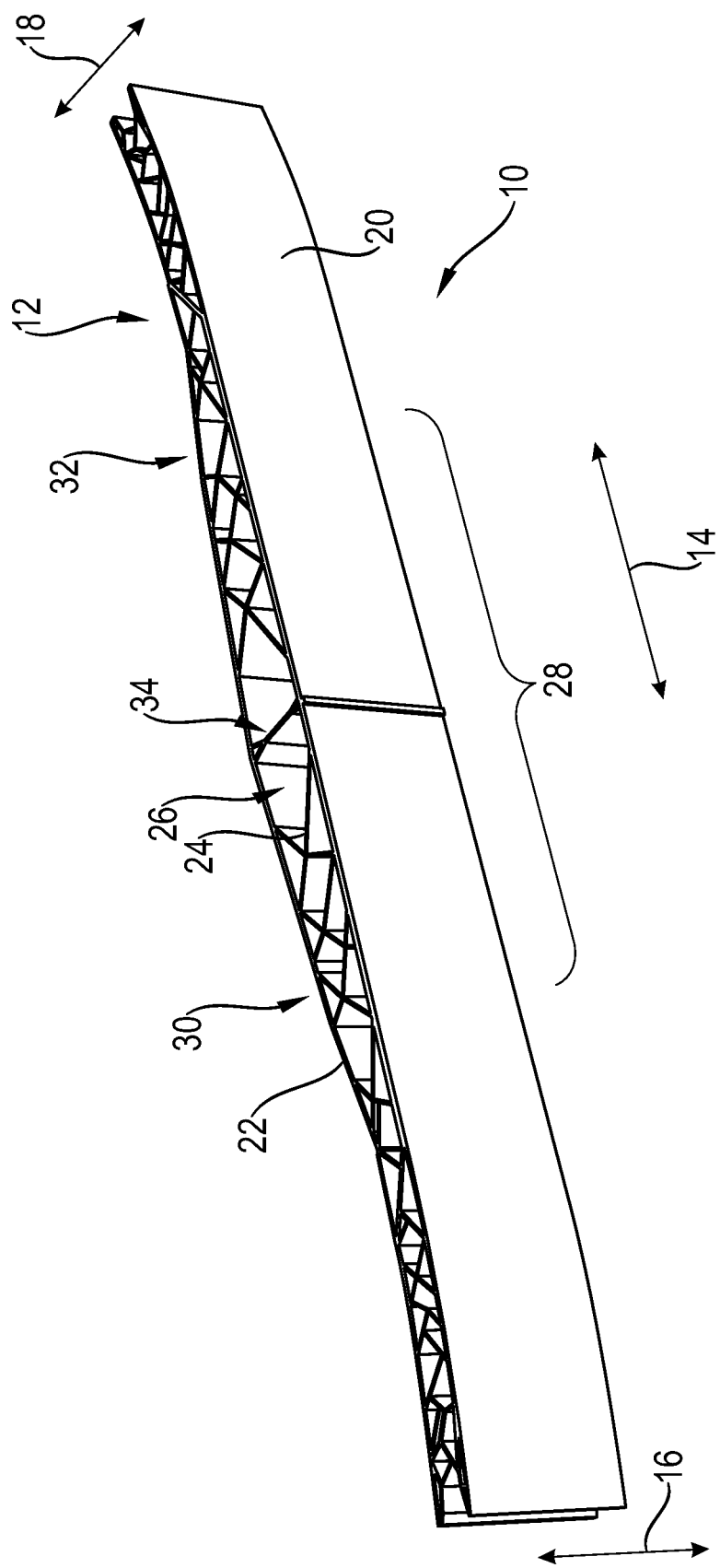

FIG. 3 diagrammatically shows the bumper crossmember 10 in a perspective view. The bumper crossmember 10 extends along a longitudinal direction 14 (profile length) which, in the assembled state, is oriented substantially parallel to the transverse axis of the vehicle (y-axis). The bumper crossmember 10 extends along a vertical direction 16 (profile height) which, in the assembled state, is oriented substantially parallel to the vertical axis of the vehicle (z-axis). In addition, the bumper crossmember 10 extends along a thickness direction 18 (profile thickness) which, in the assembled state, is oriented substantially parallel to the longitudinal axis of the vehicle (x-axis).

The bumper crossmember 10 has a hollow profile body 12 which has a vehicle frame-side proximal vertical wall 20 and a distal vertical wall 22 which are connected to one another by way of transverse walls 24 (provided merely once with designations) and extend along the vertical direction 16. The transverse walls 24 laterally (that is to say, toward the sides) delimit hollow chambers 26 which are arranged in the hollow profile body 12 (and are provided merely once with designations), the center longitudinal direction of the hollow chambers 26 being oriented in each case along the vertical direction 16, and the hollow chambers 26 being open on the end side, that is to say toward the top and toward the bottom.

The hollow profile body 12 has a greater cross section (greater profile thickness) in a middle region 28 along its longitudinal direction 14 than at its ends. The hollow profile body 12 is cambered at least in sections along its longitudinal direction 14, in the example in a middle region 28 along its longitudinal direction 14.

The hollow profile body 12 is configured in the example as an extrusion profile, for example as an extruded aluminum profile.

A single-piece configuration of the hollow profile body 12 is fundamentally conceivable (not shown). In the example, the hollow body profile 12 is formed from two preferably symmetrical profile halves 30, 32 which are connected to one another on a parting plane 34. The hollow body profile 12 is divided along its longitudinal direction 14 into two profile halves 30, 32 (two axial profile halves 30, 32). The parting plane 34 lies in the middle region 28 of the hollow profile body 12. The longitudinal direction 14 of the hollow profile body 12 represents the normal vector of the parting plane 34. The parting plane 34 does not have to be planar, but rather can also be structured.

The profile halves 30, 32 can be screwed, welded, riveted and/or adhesively bonded to one another on the parting plane 34 (not shown).

Figure 4:
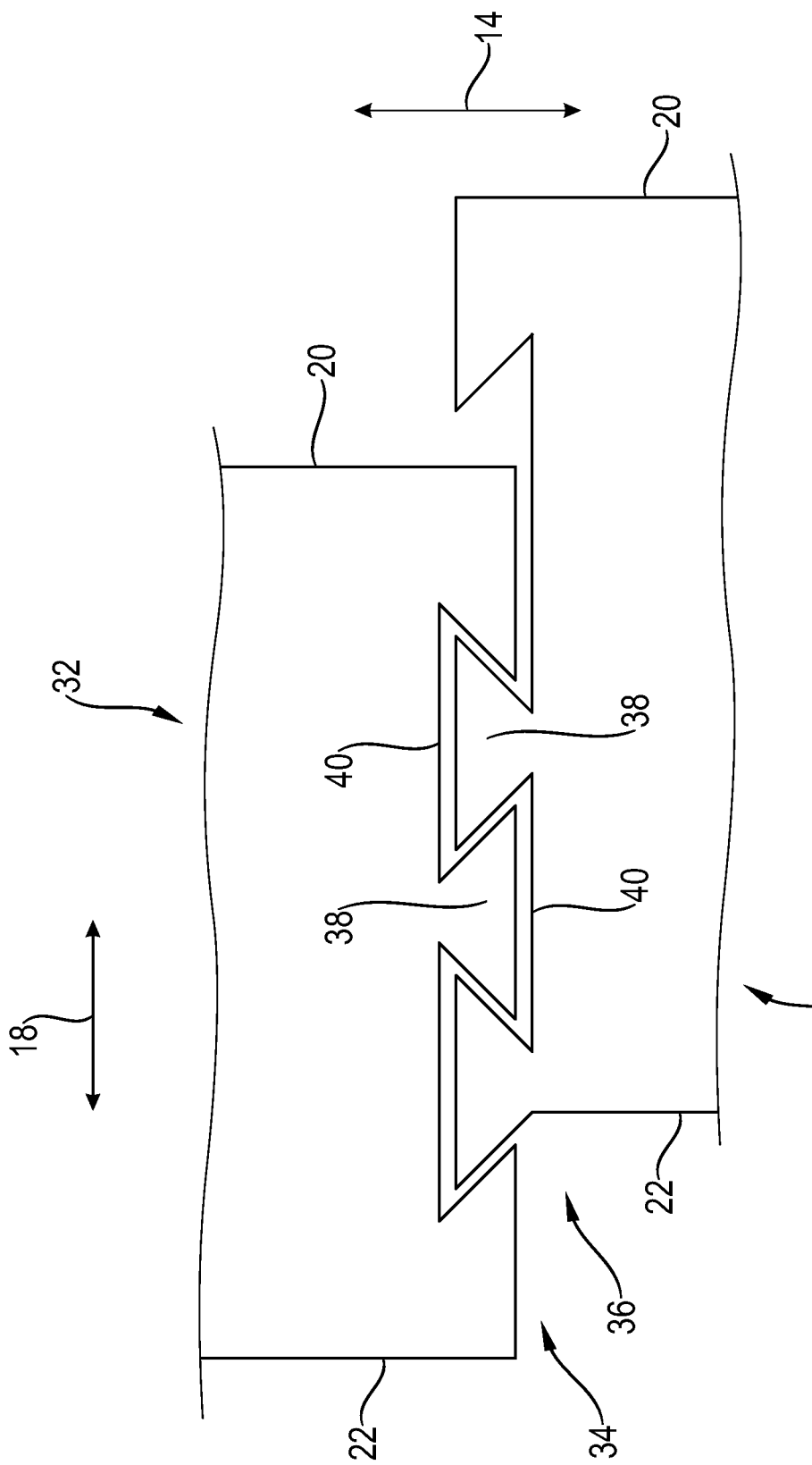

On the parting plane 34, the profile halves 30, 32 can have a pronged structure 36 (cf. FIG. 4), via which the profile halves 30, 32 can be connected or are connected to one another in a positively locking manner. The pronged structure 36 has dovetail-shaped elevations 38 and depressions 40 in an alternating manner. In the case of assembled profile halves 30, 32, they engage into one another in an alternating manner. When the profile halves 30, 32 are assembled, a depth offset can occur in the case of symmetrical profile halves 30, 32, that is to say the profile halves 30, 32 can be arranged offset slightly with respect to one another along the vertical direction 16 (profile height) (cf. offset in FIG. 4).

The profile halves 30, 32 are secured on one another against a relative movement along the vertical direction 16 (profile height). The profile halves 30, 32 can be secured on one another, for example, by way of a vertical weld or a screw connection (not shown).

What is claimed:

1. A vehicle rear arrangement comprising:
   a bumper crossmember comprising a hollow profile body having a vehicle frame-side proximal vertical wall and a distal vertical wall which extend along a vertical direction and are connected to one another by way of transverse walls, wherein the transverse walls laterally delimit hollow chambers in the hollow profile body, wherein a center longitudinal direction of each hollow chamber is oriented along the vertical direction, and wherein ends of each hollow chambers are open, and
   an air duct that is formed by a duct body and extends from an inlet opening, through an air-cooled cooling unit that is incorporated into the air duct and to an outlet opening,
   the bumper crossmember being arranged at least partially in the duct body, such that the air duct is routed through the hollow chambers disposed in the hollow profile body of the bumper crossmember.

2. The vehicle rear arrangement as claimed in claim 1, wherein, as viewed in a longitudinal direction, a cross section of the hollow profile body is larger in a middle region than at longitudinal ends of the hollow profile body.

3. The vehicle rear arrangement as claimed in claim 1, wherein the hollow profile body is cambered at least in sections along a longitudinal direction of the hollow profile body.

4. The vehicle rear arrangement as claimed in claim 1, wherein the hollow profile body is an extrusion profile.

5. The vehicle rear arrangement as claimed in claim 1, wherein the hollow profile body is formed from two profile halves which are symmetrical and are connected to one another along a parting plane.

6. The vehicle rear arrangement as claimed in claim 5, wherein the profile halves are screwed, welded, riveted or adhesively bonded to one another on the parting plane.

7. The vehicle rear arrangement as claimed in claim 5, wherein, on the parting plane, the profile halves have a pronged structure, via which the profile halves are either configured to be connected or are connected to one another in a positively locking manner.

8. The vehicle rear arrangement as claimed in claim 5, wherein the profile halves are secured to one another against a relative movement along the vertical direction.

9. The vehicle rear arrangement as claimed in claim 1, wherein, as viewed in a longitudinal direction of the hollow profile body, the hollow profile body is cambered in a middle section thereof.

* * * * *